United States Patent Office 3,050,418
Patented Aug. 21, 1962

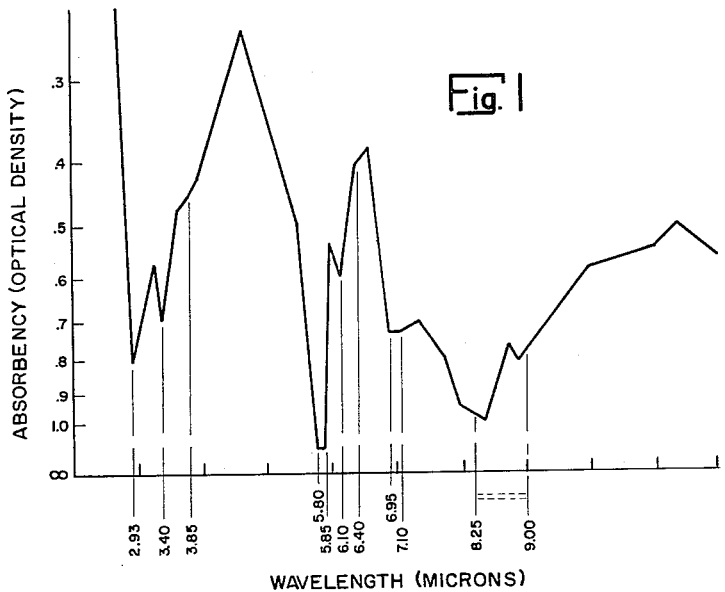
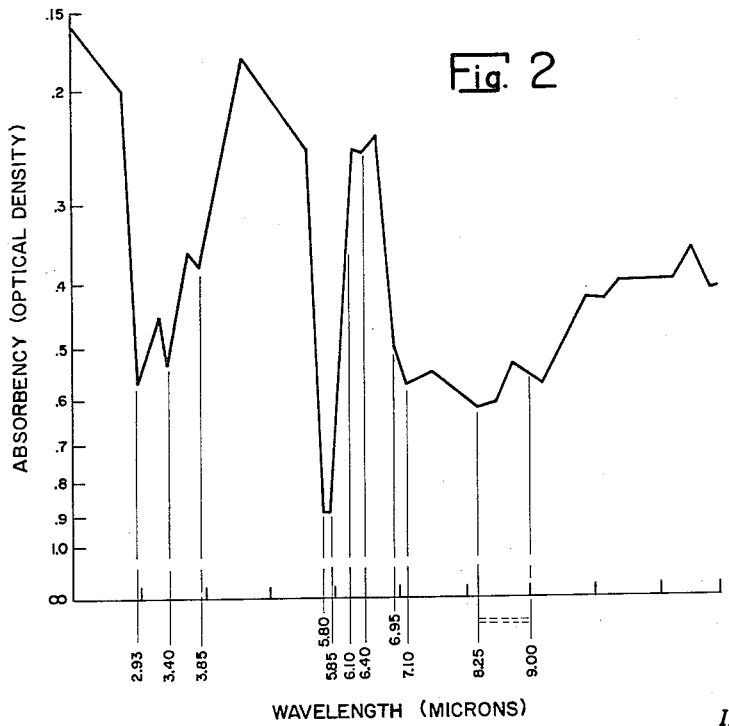

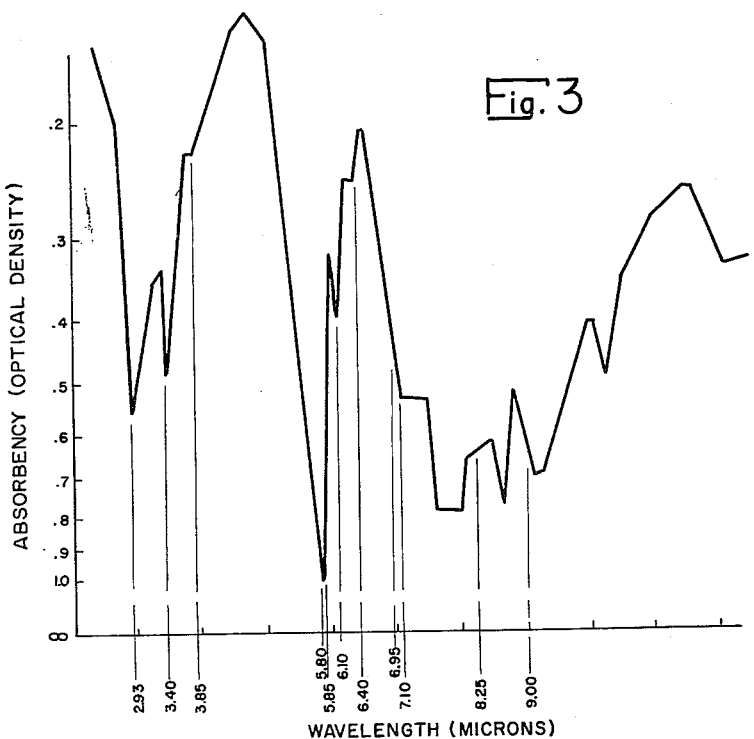
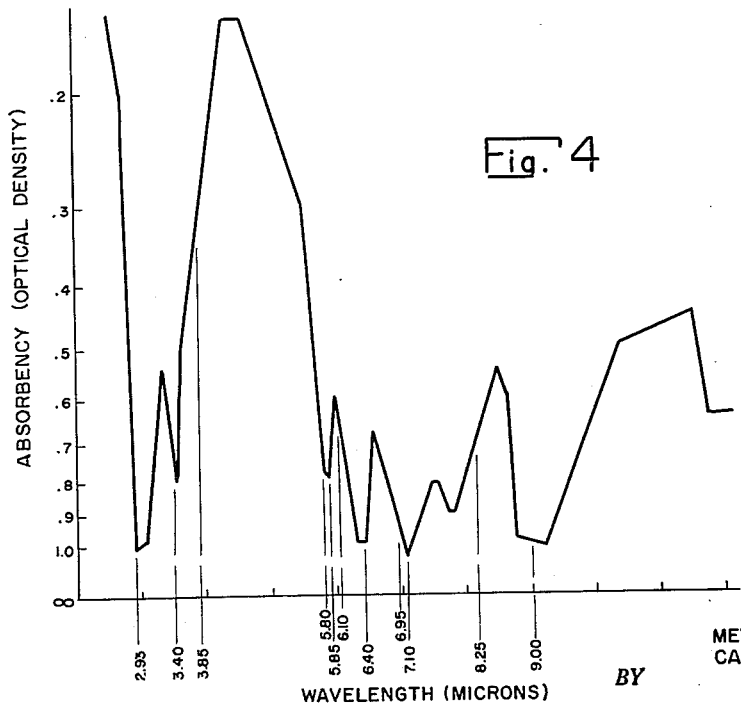

3,050,418
PROCESS FOR IMPARTING WETTABILITY TO SHAPED HYDROPHOBIC POLYMERIC MATERIAL
Meyer Mendelsohn, New York, and Carl Horowitz, Brooklyn, N.Y., assignors, by mesne assignments, to Yardney International Corp., New York, N.Y., a corporation of New York
Filed Nov. 9, 1959, Ser. No. 851,881
28 Claims. (Cl. 117—118)

Our present invention relates to the esterification of polyvinyl alcohol.

A more particular object of our invention is to provide a novel treatment for improving the wettability of articles made from substantial hydrophobic synthetic materials, such as fibers and sheets produced from polyamides (e.g. nylon).

We have found, in accordance with this invention, that the above objects can be realized by a novel reaction which involves the partial or complete esterification of polyvinyl alcohol in an aqueous medium by means of polycarboxylic (i.e. di-, tri-, tetrabasic etc.) acids.

By this reaction there is initially formed a partial or complete monoester whose radical may be represented by the following general formula:

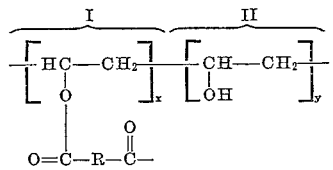

In the above formula, where the groups I and II may, of course, follow one another in any order, the following relationships obtain: $x+y=z$, $z$ being the number of monomeric groups present in the polyvinyl-alcohol molecules; with polyvinyl alcohols of different molecular weights, $z$ may range between approximately 500 and 1500. $y$ ranges from 0 to about $10x$. R is a hydrocarbon radical or a functional derivative thereof.

The free valences of the terminal carboxyl groups serve as links for attaching the ester either to a further polyvinyl-alcohol chain or to another polymeric molecule having one of the aforementioned groups capable of condensing with a carboxyl group. Naturally, some of these free valences will also be occupied simply by hydroxyl groups, thus forming part of unreacted molecular linkages.

The degree of esterification, i.e. ratio $x:z$, will be dependent upon such factors as the molar proportion of polycarboxylic acid originally present in relation to the polyvinyl alcohol (calculated on the basis of its monomeric formula), the temperature employed in the process and the duration of the reaction. This degree of esterification may, of course, be ascertained by conventional tests.

As the esterification progresses, cross-linkages will occur as the free carboxyl groups appended to the molecular groups I of one polyvinyl chain react with the hydroxyl groups of some of the molecular groups II of a neighboring chain or chains.

If, on the other hand, the process is discontinued at a stage prior to the onset of substantial cross-linking, i.e. while there are still available a large number of unreacted carboxyl groups in the polyvinyl-alcohol/acid ester, the aqueous solution of this ester may be used as a treatment agent for improving the wettability of normally hydrophobic polymeric materials. The materials so treatable include, in particular, thermoplastic resins having terminal or internal molecular groups capable of condensing with the aforementioned carboxyl groups, such as amino, hydroxyl, phenol or mercapto groups (to name some representative examples). These resins include polyamides and various polyesters. Nylon, in particular, has terminal amino groups which will react with such carboxyl groups to form an amide while liberating a molecule of water. Thus, the treatment of nylon and other reactable polymers with a solution of a polyvinyl-alcohol/acid ester according to the invention involves the attachment of such ester to a molecule of the treated polymer whereby the physical characteristics of the latter are significantly affected; in particular its wettability and the moisture permeability of porous objects made therefrom are permanently increased. We have found that even repeated washings do not noticeably reduce the improvement in wettability and moisture permeability thus obtained.

Polycarboxylic acids suitable for the practice of the invention include aromatic as well as saturated and unsaturated aliphatic acids. Exemplary of these classes are the following acids: Aconitic, adipic, alginic, aspartic, azelaic, citric, decanedicarboxylic, diglycolic, glucuronic, glutamic, glutaric, itaconic, maleic, malic, malonic, naphthalic, nonanedicarboxylic, oxalic, phthalic, pimelic, polyacrylic, sebacic, suberic, succinic and tartaric acids. The corresponding anhydrides may also be used. With substantially or completely water-insoluble acids it will be convenient to dissolve them first in a suitable organic solvent and to admix the solutions with an aqueous solution of polyvinyl alcohol, the organic solvent being then evaporated from the mixture by slow heating.

The invention will be described in greater detail with reference to the accompanying drawing in which FIGS. 1–4 show representative infrared absorbency spectra for resins prepared in accordance with Examples I to IV, respectively.

Attention is particularly called to the characteristic absorbency maxima in the region of 2.85 microns to 3.05 microns and in the region of 3.35 and 3.45 microns, as well as the characteristic dip in the region between 5.50 and 6.10 microns. In the first region, i.e. between 2.85 and 3.05 microns, a typical "deformation" area characteristic of polyvinyl-type structures and particularly of polyvinyl alcohol is shown. The ester absorption at the longer wave lengths indicates almost complete esterification of the polyvinyl alcohol.

For specific insight into the type of reaction involved the means for and the manner of carrying it out, and the novel results of this reaction, a group of examples are presented in detail as illustrative but not limitative of the invention described and claimed.

*Example I*

150 grams of polyvinyl-alcohol powder
256 grams of maleic acid
1000 grams of water
1 gram of magnesium peroxide (catalyst)

The above ingredients are mixed together at 100° C. until all the water is evaporated. The temperature is raised to 130° C. for one hour. The result is a white, amorphous mass, insoluble in water and in most common solvents. The quantities given are in stoichiometric proportions and the yield is 70% of the theoretical. The reaction is followed by testing the acidity. The initial solution has an acidity of 2.3 milliequivalents per gram; at the last stage of solubility, the acidity is 0.6 milliequivalent per gram. The raw resin when set by heat yields a yellowish, clear, transparent material which breaks with a characteristic glass-like or conchoidal fracture at the point of stress concentration. FIG. 1 represents an infrared spectrum of this material prepared through the medium of an NaCl prism.

Example II 150 grams of polyvinyl-alcohol powder
222 grams of itaconic acid
1000 grams of water
1 gram of zinc peroxide (catalyst)

The raw resin, prepared according to the procedure of Example I, is again a white amorphous powder. The thermosetting resin obtained from this raw material is a clear brownish-tan material resembling hard purified rosin but having the same characteristic fracture as the material set forth in Example I. FIG. 2 is an infrared spectrum of the material prepared in accordance with this example, obtained by means of an NaCl prism.

Example III 150 grams of polyvinyl-alcohol powder
250 grams of adipic acid
3000 grams of water Produced by the procedure of Example I, the resulting thermosetting material is a clear, hard, water-white resin with the characteristic fracture of the materials of this class. The infrared spectrum is shown in FIG. 3.

Example IV 100 grams of polyvinyl-alcohol powder
146 grams of citric acid
1000 grams of water
1 gram of magnesium peroxide The resulting thermosetting resin is a clear, transparent, reddish, glass-like material also having the characteristic fracture.

It is possible to prepare plasticized resins with the process of this invention by incorporating into the reaction mixture water-soluble plasticizers among which may be mentioned the various glycols and glycerols. The reaction is otherwise carried out in the manner of the foregoing examples as is seen in Example V. FIG. 4 is the spectrum of a resin as per Example IV.

Example V 150 grams of polyvinyl-alcohol powder
255 grams of adipic acid
55 grams of ethylene glycol
2000 grams of water
1 gram of zinc peroxide Produced in the manner of Example I, the product recovered is found not to be as brittle as the products of the preceding examples; it could be characterized as a transparent, resilient mass which is soluble in water in the proportion of 1 part to 100 parts of water.

Example VI 13 grams of polyvinyl alcohol is dissolved in 87 cc. of water by heating to a temperature of 80 to 90° C. on a water bath for three hours with continuous stirring.

50.5 grams of sebacic acid is dissolved at room temperature in 200 grams of acetone.

The second solution is slowly added to the first solution, with good agitation, while the latter is still on the water bath. The temperature of the mixture remains at the boiling point of acetone (56° C.) until substantially all of this solvent is evaporated, the complete elimination of the solvent being indicated by a rise in temperature to approximately 70° C. The residue is a clear solution of a polyvinyl-alcohol/acid ester according to the invention in a still water-soluble state.

In order to provide a treatment agent for nylon and other hydrophobic polymers, however, the solution is further diluted at this stage by the addition of 400 cc. of water and is heated to about 60° C. A piece of nylon fabric is then dipped for one minute in the solution and, after removal, squeezed and dried in an oven for five minutes at 125 to 150° C. It is then washed with copious amounts of running water and allowed to dry at room temperature.

After a period of twelve to twenty-four hours the dried nylon is tested for wettability by the technique of the American Association of Textile Chemists and Colorists described on page 125 of the 1955 Technical Manual & Yearbook of the AATCC, Tentative Test Method 39-52, according to which one observes the time required for the disappearance of a drop of water placed on the fabric. This time is found to be 85 seconds for the fabric so treated, compared with approximately 625 seconds for an untreated sample.

Example VII 37 grams of phthalic acid is dissolved in 330 cc. of water, and 85 cc. of a 13% aqueous polyvinyl-alcohol solution is added. The solution is heated to the boiling point, whereupon a piece of nylon fabric is immersed in the solution, squeezed and dried as in the preceding example. The wettability as measured by the aforedescribed AATCC method is 125 seconds. If oven drying is omitted, the wettability is 300 seconds.

Similar wettability results are obtained when succinic acid or its anhydride is employed in lieu of the phthalic acid of this example.

Example VIII 15 grams of diglycolic acid is dissolved in a 10% aqueous solution of polyvinyl alcohol. The procedure of Example VII is followed, giving a wettability of 140 seconds upon drying of the sample at room temperature only. In all the foregoing examples the acid referred to may be replaced by an equivalent amount of its anhydride.

The wettability of polyamide fibers and sheets when treated in accordance with Examples VI–VIII can be materially increased by the addition of a suitable detergent to the solution, e.g. sulphonated lauryl alcohol in a quantity of 0.01% to 1% by weight. The measurement of improvement will be a reduction of the drying time of the test drop to as little as 20 seconds. Similar results are obtained with other commercial detergents.

It will be understood that Examples I–V may be modified in accordance with the procedure of Examples VI–VIII to yield a treatment agent for nylon and the like.

The improvement in moisture permeability of a piece of nylon fabric, for example, when treated in accordance with the present invention has been found to be as high as 400% by a simple test involving the steps of placing such fabric between a thoroughly wetted and a dry piece of blotting paper, letting the two absorbent papers with the fabric therebetween stand under slight pressure for a period of one to five minutes while shielding the assembly against the atmosphere to prevent moisture evaporation, determining the weight increase of the originally dry blotter resulting from the absorption of water through the fabric over this period, and comparing this weight increment with that of a piece of blotting paper similarly treated with interposition of a piece of ordinary nylon fabric.

We claim:

1. A process for preparing a novel, readily wettable, composition of matter which comprises heating polyvinyl alcohol and a polycarboxylic acid under esterifying conditions for a sufficient time to effect a partial esterification so as to produce an ester having unreacted groups selected from a class consisting of hydroxy and carboxy groups, and reacting said ester at elevated temperatures with a hydrophobic thermoplastic polymeric material having functional groups capable of reacting with said unreacted groups of said ester whereby chemical bonds are formed between said hydrophobic thermoplastic polymeric material and said ester.

2. A process according to claim 1 wherein said functional groups of said polymeric material is selected from the class consisting of amino, hydroxy, phenol and mercapto groups.

3. A process according to claim 2 wherein said polymeric material is a polyamide.

4. A process according to claim 2 wherein said polymeric material is nylon.

5. A process according to claim 2 wherein said polymeric material is a polyester.

6. A process for improving the wettability of a polymer selected from the class consisting of hydrophobic polyamides and polyesters which comprises reacting a polyvinyl alcohol and a polycarboxylic acid for sufficient time at elevated temperatures in aqueous medium under esterifying conditions to affect a partial esterification thereof and to form an aqueous solution of said ester having unreacted groups selected from the class consisting of hydroxy and carboxy groups, treating said polymer with said ester solution and then heating the polymer so treated at elevated temperatures so that said polymer reacts with said ester and forms chemical bonds therewith, whereby the wettability of said polymer is improved.

7. A process according to claim 6 wherein the acid is sebacic.

8. A process according to claim 6 wherein the acid is citric.

9. A process according to claim 6 wherein the acid is diglycolic.

10. A process according to claim 6 wherein said polymer is a polyamide.

11. A process according to claim 10 wherein said polyamide is nylon.

12. A process according to claim 11 in which the acid is phthalic acid.

13. A process according to claim 11 in which the acid is succinic acid.

14. A process according to claim 11 in which the acid is adipic acid.

15. A process according to claim 11 in which the acid is itaconic acid.

16. A process according to claim 11 in which the acid is maleic acid.

17. A readily wettable composition of matter comprising the reaction product of a partial ester of polyvinyl alcohol and a polycarboxylic acid having unreacted groups selected from the class consisting of carboxy and hydroxy groups and a hydrophobic thermoplastic polymeric material having functional groups capable of reacting with said unreacted groups, said polymeric material being chemically bonded to said ester.

18. A composition according to claim 17 wherein said functional groups are selected from the group consisting of amino, hydroxy, phenol and mercapto groups.

19. A composition according to claim 17 wherein said polymeric material is selected from the group consisting of polyesters and polyamides.

20. A composition according to claim 19 wherein said polymeric material is nylon.

21. A composition according to claim 19 wherein said acid is phthalic.

22. A composition according to claim 19 wherein said acid is succinic.

23. A composition according to claim 19 wherein said acid is adipic.

24. A composition according to claim 19 wherein said acid is itaconic.

25. A composition according to claim 19 wherein said acid is maleic.

26. A composition according to claim 19 wherein said acid is sebacic.

27. A composition according to claim 19 wherein said acid is citric.

28. A composition according to claim 19 wherein said acid is diglycolic.

References Cited in the file of this patent

UNITED STATES PATENTS

| 2,145,345 | Dreyfus | Jan. 31, 1939 |
| 2,565,962 | Goldstein et al. | Aug. 28, 1951 |